United States Patent [19]
Behr

[11] Patent Number: 5,536,131
[45] Date of Patent: Jul. 16, 1996

[54] UTILITY TRAILER WITH LEVEL LOAD SUPPORT TO AND FROM THE GROUND

[76] Inventor: Albert Behr, 1480 Arrow Hwy., La Verne, Calif. 91750

[21] Appl. No.: 368,524

[22] Filed: Jan. 4, 1995

Related U.S. Application Data

[63] Continuation of Ser. No. 124,105, Sep. 20, 1993, abandoned.

[51] Int. Cl.[6] ............................................. B60P 1/02
[52] U.S. Cl. ........................... 414/495; 292/163; 296/25
[58] Field of Search ........................ 414/482–485, 414/495; 296/25; 292/60, 61, 332, 163, 145, 146, 175

[56] References Cited

U.S. PATENT DOCUMENTS

| | | | |
|---|---|---|---|
| 2,230,014 | 1/1941 | Raven | 414/495 X |
| 3,397,000 | 8/1968 | Nakanishi | 292/61 |
| 4,245,945 | 1/1981 | Rizzo | 414/495 X |
| 4,461,609 | 7/1984 | Zinno | 414/495 |
| 4,635,327 | 1/1987 | Netznik | 292/60 X |
| 4,637,770 | 1/1987 | Swadell | 414/495 |
| 4,671,730 | 6/1987 | Gateau | 414/495 |
| 4,673,328 | 6/1987 | Shiels | 414/495 X |
| 4,685,855 | 8/1987 | Celli | 414/495 X |
| 5,035,462 | 7/1991 | Page et al. | 414/495 X |
| 5,288,197 | 2/1994 | Harris | 414/495 |

FOREIGN PATENT DOCUMENTS

| | | | |
|---|---|---|---|
| 2089874 | 6/1982 | United Kingdom | 292/163 |
| 2190349 | 5/1987 | United Kingdom | 414/495 |
| 8603168 | 6/1986 | WIPO | 414/495 |

*Primary Examiner*—David A. Bucci
*Attorney, Agent, or Firm*—Louis J. Bachand

[57] ABSTRACT

A utility trailer affording level load support to the ground has a frame and a shiftable platform supported on shafts which are journaled on the frame and on the platform in offset relation so that tilting of the platform during shifting is torsionally opposed. The frame and platform are fastened together by a snap bolt arrangement in response to movement of the platform relative to the frame.

20 Claims, 5 Drawing Sheets

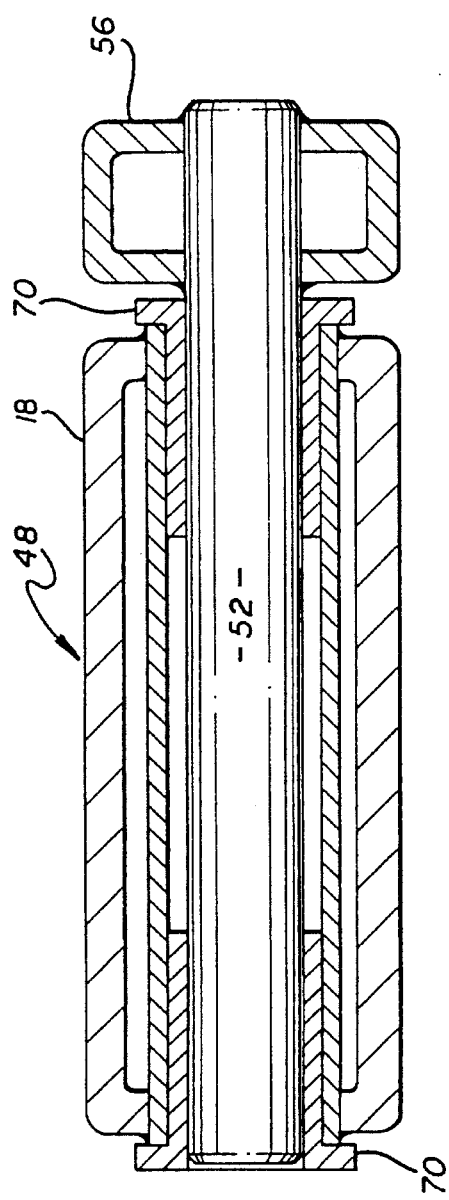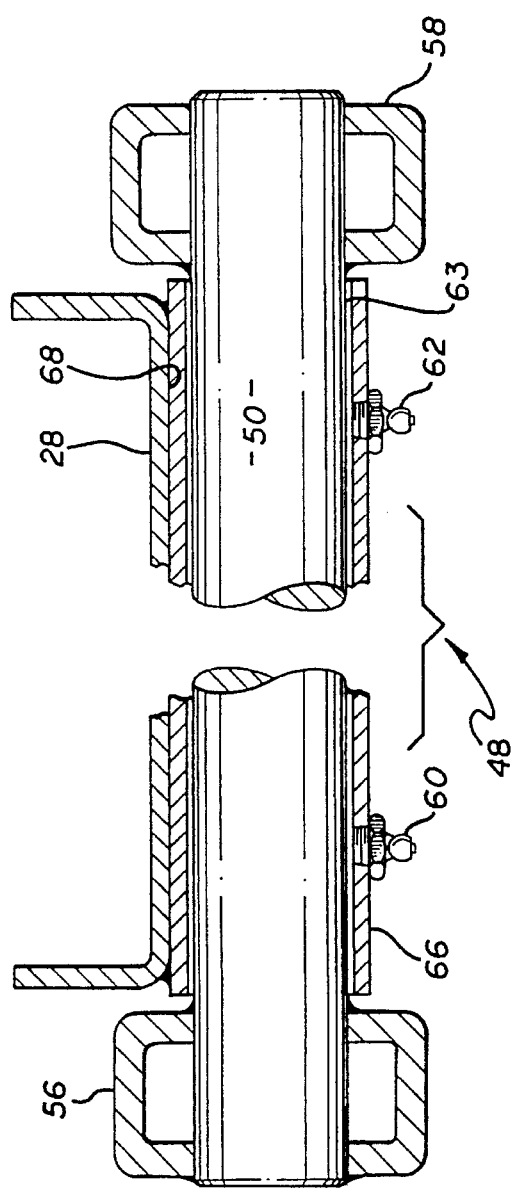

FIG. 5
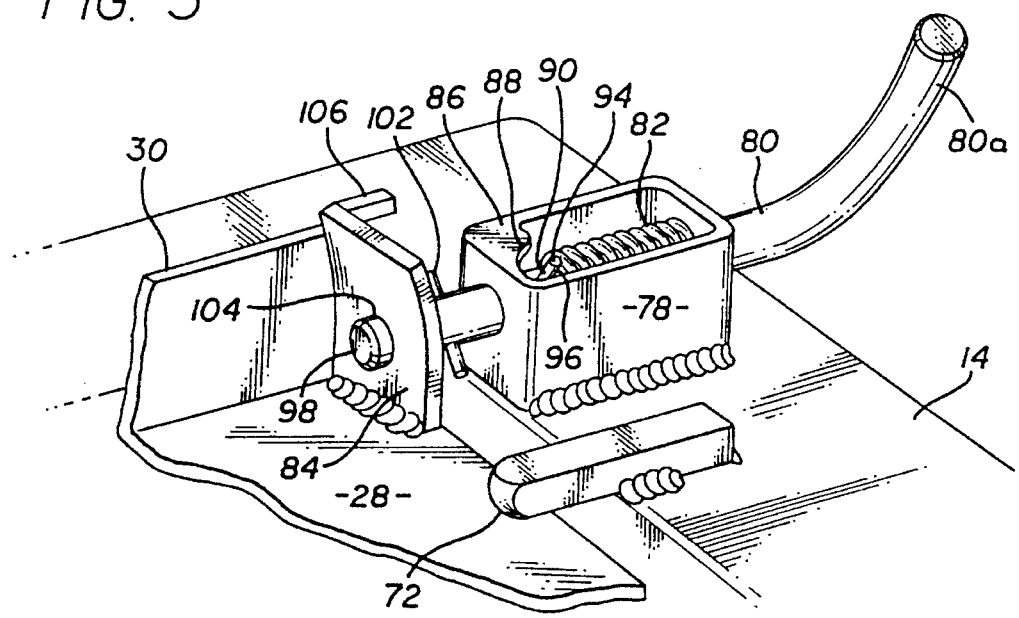
FIG. 7
FIG. 8
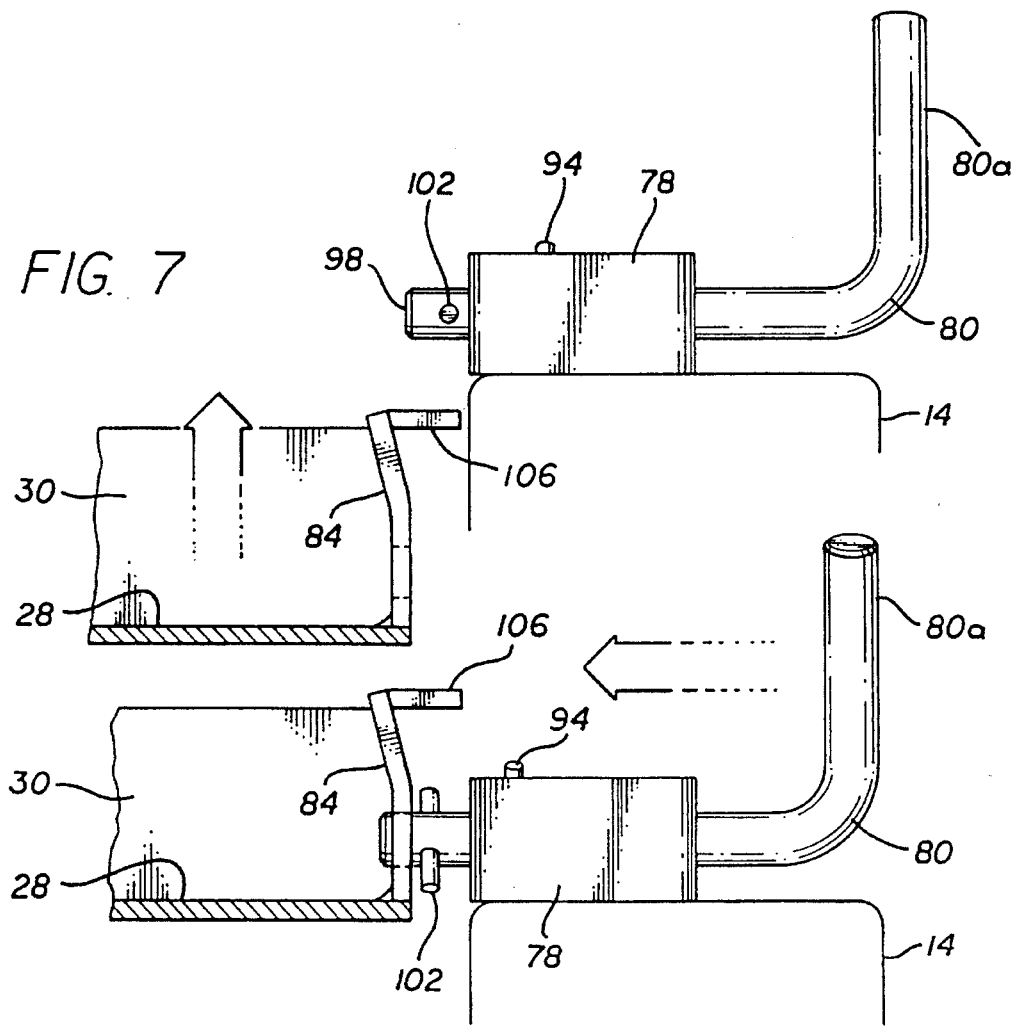

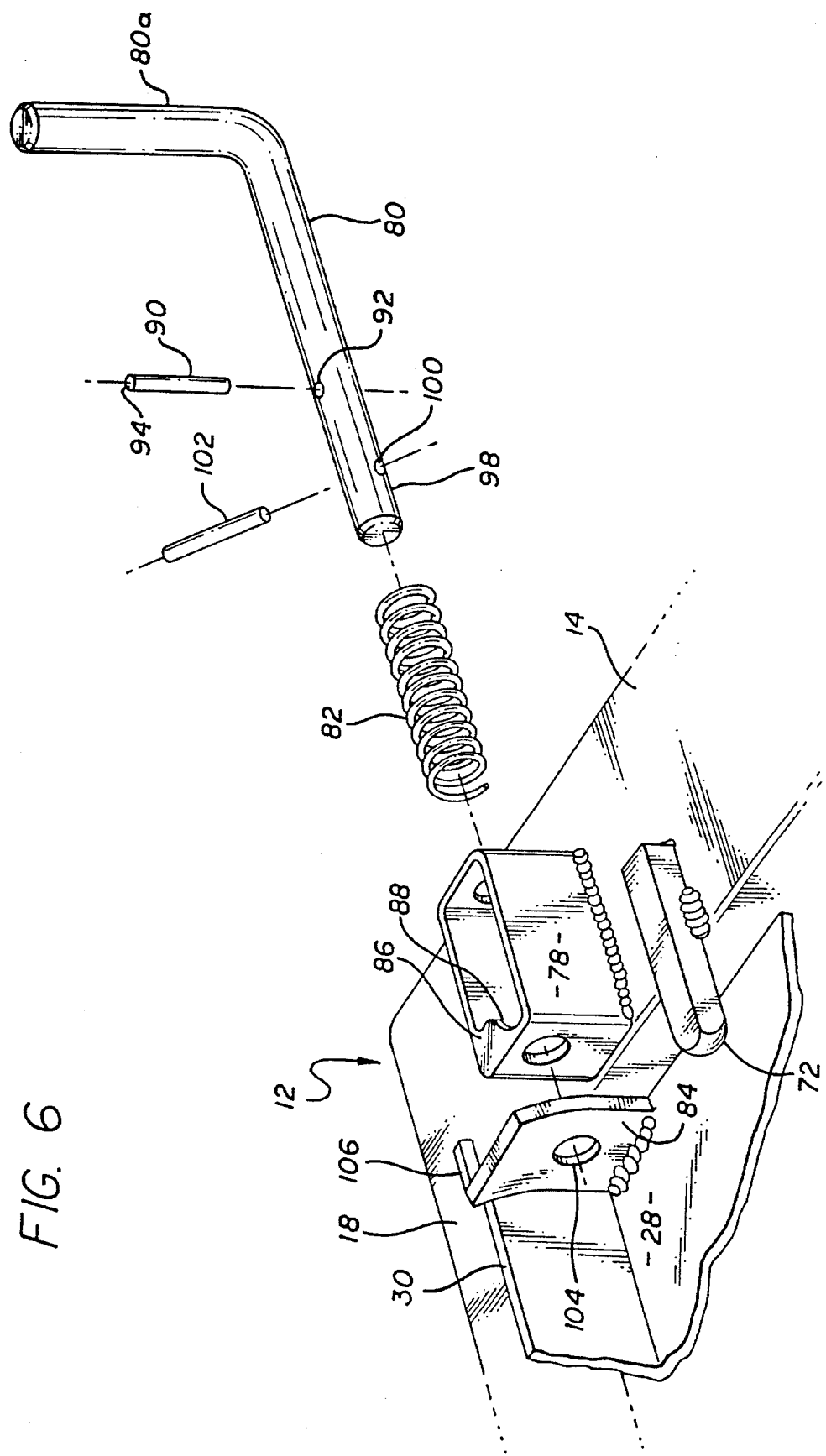

UTILITY TRAILER WITH LEVEL LOAD SUPPORT TO AND FROM THE GROUND

REFERENCE TO RELATED APPLICATION

This application is a continuation of my earlier application Ser. No. 08/124,105, filed Sep. 20, 1993, now abandoned, the disclosure of which is incorporated herein by this reference.

TECHNICAL FIELD

This invention has to do with utility trailers such as those towed behind pick-up trucks, cars, vans and other vehicles and used to carry tools, machines, recreational vehicles, such as motorcycles and personal watercraft, and other cargo loads of greater or less weight. More particularly, the invention relates to such utility trailers in which the platform lowers level to the ground to ease loading and off-loading of cargo, avoiding lifting or ramping up of cargo, and in which the cargo is carried level during loading and unloading regardless of eccentric distribution of the cargo; this feature being attributable to the trailer platform being supported on transverse shafts which are shaped and mounted to resist in torsion any tilting of the trailer platform during shifting between the normal riding position and flat to the ground. Further, the present trailer has moving parts protected against intrusion of dirt and debris, for failure-proof operation.

BACKGROUND

Utility trailers are widely known and generally comprise a frame supported on wheels and a platform on which the load is placed. For loading and unloading cargo, the trailer is tipped, ramps are used, or the platform is lowered to the ground. Such platforms are sometimes movable, See U.S. Pat. Nos. 2,487,508 to Anderson, 2,775,357 to Armen, 2,822,944 to Blomgren, 3,039,633 to Mindrum et al, 3,468,440 to Poole, 4,049,143 to Hatakka et al, 4,061,359 to Metcalfe et al. 4,077,643 to Bates, 4,673,328 to Shields, 4,752,177 to Zenna. In the Shields patent, the load carrying platform is carried on slides, termed roller tracks, to enable ground level or tilt loading of cargo. The Shiels design relies on easy movement of rollers in the tracks. The disadvantages of Shiels include hanging up of the roller in the open-faced tracks should the slides or rollers become dirty or mud-caked, and wedging of the rollers in the tracks should the loads by unevenly distributed and the platform become canted. The Shiels patent, and the other cited patents as well, furnish no means of resiliently resisting tilting of the platform, and subsequent wedging in place.

SUMMARY OF THE INVENTION

It is an object of the invention, therefore, to provide a utility trailer having flat; ground level loading. It is another object to provide a utility trailer in which the platform is shiftable from a ride level to the ground level while keeping the trailer parallel to the ground. It is another object to provide such a utility trailer in which the platform carriage is free of exposed moving parts and resiliently resist to tilting or canting even when eccentrically loaded. It is another object to provide an improved locking means for a trailer having a shiftable platform, which automatically locks when the platform is raised into place.

These and other objects are realized in accordance with the invention in a utility trailer providing level load support to and from the ground, the trailer comprising a frame supported on wheels and having a transverse base and extending therefrom opposed longitudinal arms, the frame arms having first and second journaling means, a laterally and longitudinally extended platform between the frame arms, the platform having a third journaling means extending transversely thereof and offset from the first and second journaling means, drawing means to control shifting of the platform relative to the frame, and a transverse support shaft having offset end portions journaled in the first and second journaling means and a central portion journaled in the third journaling means for guiding vertical movement of the platform, the shaft acting to torsionally resist tilting of the platform from a level condition during shifting of the platform to and from the ground.

In this and like embodiments of the invention: the frame arms each carry a stub axle, the wheels being mounted to the axles; the frame arm first and second journaling means comprise bearings adapted to receive the support shaft end portions in journaling relation; the platform third journaling means comprises a tubular element extending transversely of and below the platform, and there are bearings within the tubular element adapted to receive the support shaft central portion in journaling relation; the drawing means comprises a cable and reel therefor, the cable being coupled to the platform at one end and to the reel at the other end, whereby the cable is reelable in or out to respectively raise or lower the platform; the support shaft further includes offset links connecting respective shaft end portions with the shaft central portion, the links being of a length sufficient to lower the platform from trailer height to the ground, and of a width to fit between the platform and the frame arms.

In a more particularly preferred embodiment, the trailer has both front and rear support shafts spaced along the longitudinal extent of the platform.

In yet another embodiment, the invention provides a utility trailer providing level load support to and from the ground, the trailer comprising a U-shape metal frame having a transverse base and opposed longitudinal arms, the frame arms carrying stub axles to which trailer wheels are mounted, and fore and aft of the wheels front and rear pairs of frame arm-carried journaling means, a shiftable, load-carrying, rigid and generally rectangular platform between the frame arms, the platform being adapted to pass between the stub axles from a riding height to the ground, the platform having front and rear undermounted journaling means extending parallel to each other transversely of the platform and offset from respective pairs of frame arm-carried journaling means, drawing means to control shifting of the platform relative to the frame, and front and rear transversely disposed support shaft journaled in the frame arm journaling means and in the platform journaling means for guiding vertical movement of the platform, the shafts being disposed to torsionally resist tilting of the platform from a level condition during shifting of the platform to and from the ground.

In this and like embodiments: there is also included means to lock the platform in upraised position; the frame arm journaling means comprise bearings adapted to receive the ends of the support shafts in journaling relation; the platform journaling means comprises front and rear tubular elements secured below the platform adapted to receive the respective centers of the support shafts in journaling relation; the drawing means comprises a cable and reel therefor, the cable being coupled to the platform at one end and to the reel at the other end, whereby the cable is reelable in or out to respectively raise or lower the platform; and the support shafts further include offset links between the respective center and end portions of the shafts, the links being of a length sufficient to lower the platform from trailer height to the ground.

In preferred embodiments, the locking means comprises a spring-loaded bolt and housing combination and a cooperating keeper disposed in opposed relation on the frame and platform.

In this and like embodiments, preferably, the locking means bolt and housing combination further includes a detent formed in the housing adapted to release the bolt responsive to full lifting of the platform into the frame or to hold the bolt open against its spring loading in the absence of full lifting of the platform into the frame; the locking means detent comprises a cam shoulder, the bolt having a cam follower comprising means extending radially from the bolt within the housing and adapted to retain the bolt engaged with the cam shoulder in a first rotational position of the bolt and to disengage from the cam shoulder in a second rotational position of the bolt, and cooperating means on the platform and the bolt to rotate the bolt to the second rotational position in response to full lifting of the platform into the frame, whereby the bolt is disengaged from the cam shoulder and enters the keeper.

Further, typically, the cooperating means on the bolt extends radially from the bolt beyond the housing, and the cooperating means on the platform comprises tab means in projecting relation on the platform, the tab means, upon the platform being raised to fully lifted position, deflecting the bolt cooperating means pin to rotate the bolt from a first rotational position with the bolt cam follower means in engagement with the cam shoulder and the bolt withdrawn into the housing to disengage the bolt cam follower means from the cam shoulder to allow the bolt to extend into the keeper upon the platform being raised to fully lifted position.

In yet another embodiment, the invention provides a utility trailer having a stationary frame member, a relatively movable platform member, and fastener means for locking the members together, the fastener means comprising on one member a bolt housing, a spring-loaded bolt movable translationally into and out of the housing and rotationally on its longitudinal axis, and a bolt keeper on the opposite member to receive the bolt, the bolt housing defining a cam shoulder, the bolt carrying a cam follower comprising a first pin projecting radially from the bolt within the housing, the first pin being adapted to engage the cam shoulder in a first rotational position of the bolt, the bolt carrying a second radially projecting pin outside the housing, longitudinally spaced from the first pin, and means on the opposite member to drive the second pin angularly thereby to rotate the bolt in first pin disengaging relation with the cam shoulder to retain or extend respectively the bolt into the keeper. In this and like embodiments, the second pin driving means typically comprises a tab means carried on the opposite member in fixed position to engage the second pin for rotation to disengage the first pin from the cam shoulder to release the bolt responsive to the movable member entering full registration with the stationary member, respectively.

In a still further embodiment, the invention provides a utility trailer latch assembly for latching a first trailer member to a relatively movable second trailer member, the assembly comprising a latch bolt mounted in a housing on the first trailer member to have translational and rotational freedom, a keeper on the second trailer member, spring means biasing the latch bolt toward the keeper, the housing means limiting latch bolt translational movement toward the keeper in a first angular position of the latch bolt, means to rotate the latch bolt to a second angular position in which the latch bolt translational movement is not limited, the rotating means being carried by the latch bolt and the first trailer member in cooperating relation for rotating the latch bolt upon relative movement between the first and second trailer members and latching the latch bolt in the keeper in response to the relative movement of the members.

BRIEF DESCRIPTION OF THE DRAWINGS

The invention will be further described in conjunction with the attached drawings in which:

FIG. 3 is a view taken on line 3—3 in FIG. 1;

FIG. 4 is a view taken on line 4—4 in FIG. 1;

FIG. 5 is an isometric view of the invention latch assembly;

FIG. 6 is an exploded view of the latch assembly;

FIG. 7 is a side elevational view of the latch assembly with the trailer platform mounted keeper out of registration with the latch bolt; and, FIG. 8 is a view like FIG. 7, but showing the keeper in registration with the latch bolt.

DETAILED DESCRIPTION

Figure 1:
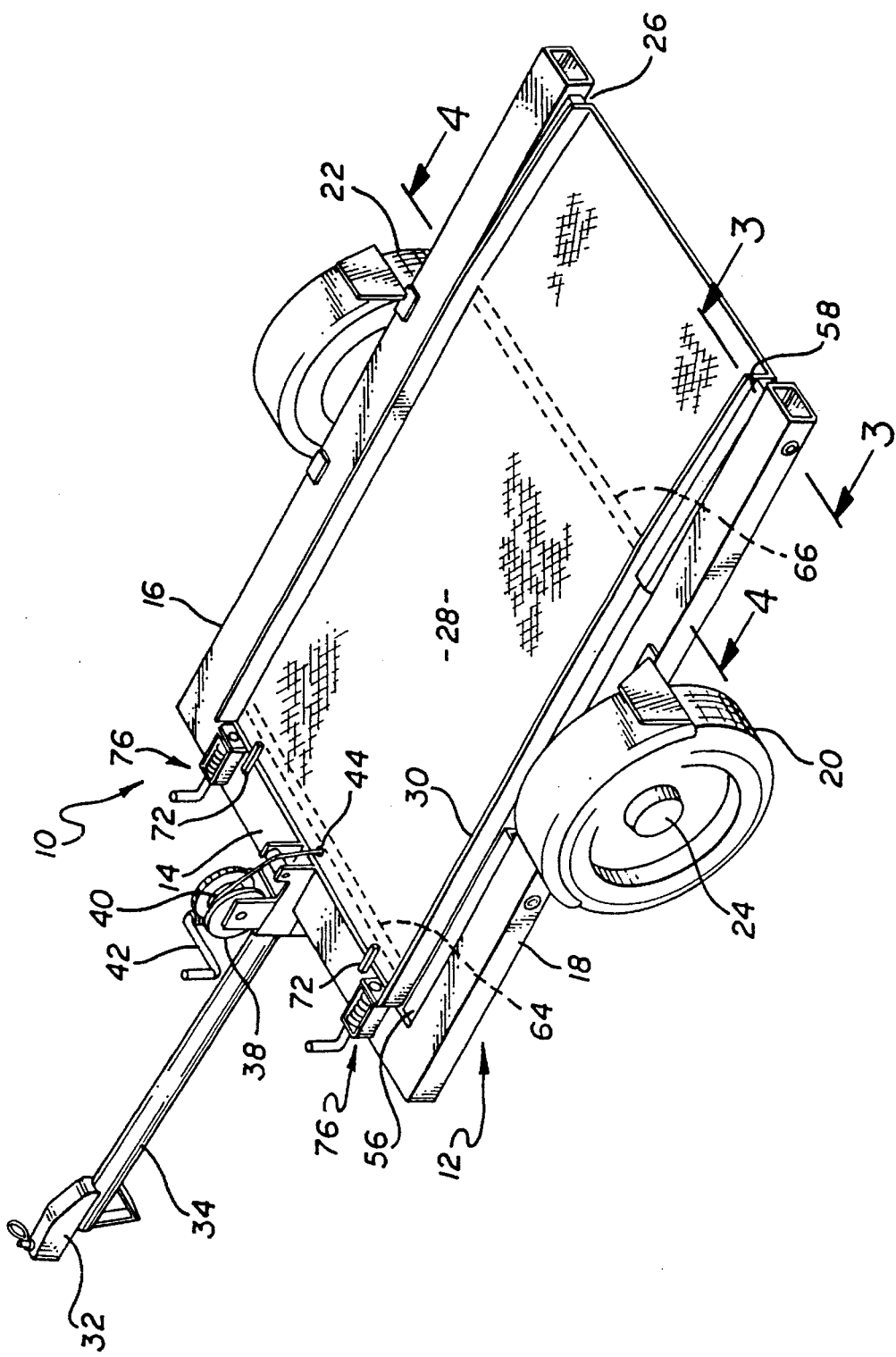
FIG. 1 is an isometric view of the invention utility trailer.
Figure 2:
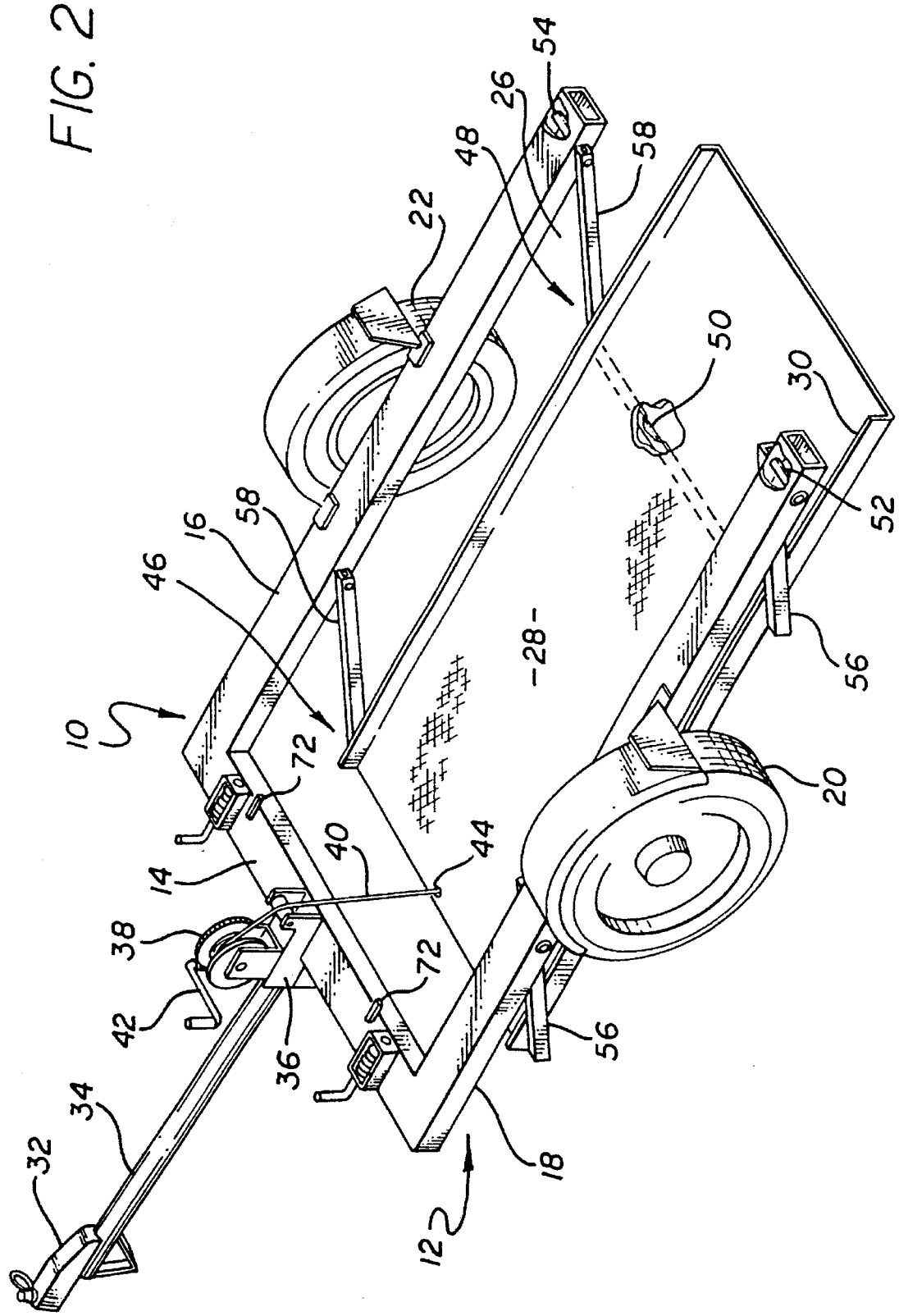
FIG. 2 is a view like FIG. 1, with the trailer platform lowered.

With reference now to the drawings in detail, particularly FIGS. 1–4, the utility trailer, shown at 10 in FIGS. 1 and 2, has a frame 12 formed of three rigid box members including transverse frame base 14 and left and right, longitudinally extended frame arms 16, 18 welded to the base. Left and right wheels 20, 22 are mounted on the stub axles 24 carried by the frame arms 16, 18 without extending into the space 26 defined by the frame arms and the base 14. A laterally and longitudinally extended, e.g. generally rectangular platform 28 occupies the space 26. The platform 28 is suitably formed of steel plate of the strength suitable for carrying the loads contemplated. A perimeter flange 30 runs along the sides of the platform opposite the frame arms 16, 18 and base 14. The trailer 10 is connectible to a towing vehicle (not shown) by hitch assembly 32 carried on tongue 34 secured to the frame 12 at frame base 14 by mounting bracket 36.

A pair of latch assemblies 76, to be later described, are carried at the frame base 14 for securing the platform 28 to the frame 12 at the base. Also mounted at the frame base 14, atop tongue mounting bracket 36 is a reel 38 wound with cable 40 and having crank 42. Cable 40 is terminally connected to the platform 28 at cleat 44, and serves to draw the platform up by reeling in cable, or to control platform descent by unreeling the cable from the reel 38 by crank 42.

The platform 28 is further supported on the frame by fore and aft support shafts 46, 48 on either side of wheel axle 24, best seen in FIG. 2. Supports shafts 46 and 48 are identical in this embodiment, and each comprise a central portion 50 and two end portions 52, 54, which are offset from the shaft central portion as shown. Completing the support shafts 46, 48 are offset links 56, 58 which bridge the offset between end portions 52, 54 and central portion 50. Except for the links 56, 58, the support shaft portions 50, 52 and 54 are typically round bars; the links 56, 58 typically are rigid box members welded to the shaft portions 50, 52 and 54 to form a unitary support shaft 46 or 48. The lateral dimensions of the links 56, 58 are such that the links fit between the platform 28 and frame arms 16, 18, See FIG. 1, The length of the links 56, 58 is such that the platform 28 can be lowered from its riding position (FIG. 1) to its loading or unloading position flat on the ground (FIG. 2).

The support shafts central portions 50 are journaled in fore and aft tubular elements 64, 66 which in turn are transversely disposed and welded to the underside 68 of the platform 28 (FIG. 4) and protect the shaft portion 50 against exposure to dirt and roadway hazards. Crease nipples 60, 62 admit lubricant into the journals 63 defined by the tubular elements 64, 66.

The support shaft end portions 52, 54 are also journaled in bearings, specifically bearings 70 fixed within the frame arms 16, 18, as shown (FIG. 3), the locus of the bearings 70 being offset from the locus of the tubular elements 64, 66 a distance for purposes to appear and which is bridged by the links 56, 58 as previously described.

Thus arranged, the end portions 52, 54 of support shafts 46, 48 will rotate in bearings 70 in the frame arms 16, 18 and the shaft central portions 50 will rotate in bearings journals 63 in the tubular elements 64, 66 as the platform 28 is either raised or lowered by means of cable 40, guided and supported by the support shaft links 56, 58.

Importantly, the platform 28 is constrained against tilting, canting or tipping in the course of being lowered or raised by the described arrangement of support shafts 46, 48. This constraint is found in the resistance of the shafts 46, 48 to twisting, or their torsional resistance. In order for the platform 28 to tilt toward one corner or another, it is necessary for the support shaft end portion 52 or 54 to twist relative to the central portion 50, as can be seen from a consideration of the shaft 46 or 48 configuration best shown in FIG. 2. This twisting is torsionally resisted as the shaft end portions 52, 54 are captured in bearings 70 and the shaft central portion 50 is captured in journals 63, requiring stress to be borne by twisting the shafts 46, 48 rather than displace them; the offset between shaft central portion 50 and end portions 52, 54 leverages the stress. The described torsional resistance urges the platform 28 to stay level, regardless of eccentricity of load. This feature also contributes to smoothness of ride of the platform 28. Finally, stops 72 project from frame base 14 to engage the front edge 74 of platform 28 and limit the rise of the platform beyond registration with the frame 12.

Although any conventional means of securing the platform 28 to the frame 12 may be used, the invention further provides a novel means of latching the trailer platform 28 at riding height. These latch assemblies are indicated at 76 in the Figures, and are particularly advantageous for snap-action locking when the platform 28 is in proper position, making the trailer 10 safer to operate, and yet they are readily unlatched as well.

With particular reference to FIGS. 5, 6 and 7, the latch assemblies 76 comprise a housing 78 mounting a bolt 80 and compression spring 82 which pre-loads the bolt. The housing 78 is mounted to the frame base 14 and the latch keeper 84 is mounted to the platform 28, but these parts can be reversed. The bolt 80 is mounted in housing 78 for rotational movement on its own longitudinal axis and for translational movement from the housing to and from the keeper 84. The remote end 80a of the bolt 80 is bent upward to facilitate manually drawing the bolt back.

The housing 78 defines a bolt detent 86 to restrain movement of the bolt 80 in certain use conditions of the latch assembly 76. In the drawings, the detent 86 is particularized as a cam shoulder 88 formed in a forward corner of the housing 78. The bolt 80 has a radially projecting inner pin 90 fixed in bolt inner diametrical bore 92. One end 94 of the inner pin 90 defines a cam follower 96 which rides on the cam shoulder 88. The movement of the bolt 80 is thus controlled by engagement of the bolt inner pin 90 and the cam shoulder 88. This engagement is in turn controlled by the relative angular orientation of the bolt 80 as will now be described.

The portion 98 of bolt 80 projecting from the housing 78 has a diametrical outer bore 100, typically, as shown (FIG. 6), angularly offset from the inner pin bore 92. Outer pin 102 is fixed in outer bore 100 to project as shown.

Turning to the cooperating structure carried on the platform 28, keeper 84 has in addition to bolt receiving bore 104 a tab 106 fixed in forwardly projecting relation on the keeper 84. The specific structural arrangement of tab 106 is dependent on the positioning of the outer pin 102, since the outer pin is intended to engage the tab 106 during upward movement of the platform 28. In this manner, movement of the platform 28-carried keeper tab 106 to the bolt outer pin 102, deflects the outer pin in an angular movement which rotates the bolt 80 on its axis and causes the inner pin 90 to correspondingly move from its engagement with the cam shoulder 88. With the bolt 80 in retracted condition, i.e. detented by engagement of the inner pin 90 with the cam shoulder 88, against the force of compression spring 82, rotation of the bolt 80 by tab 106 acting on outer pin 102 will cause the inner pin to move along the cam shoulder and permit the bolt 80 to shoot forward with the force of the spring.

In the structure shown, the engagement of the tab 106 with the bolt outer pin 102 coincides with the arrival of the platform 28 into registration with the surrounding frame 12, and the platform is automatically latched without further effort by the user.

The bolt 80 is reset for another automatic latching by manually resetting in conjunction with withdrawal of the bolt in the housing and detenting thereof on the cam shoulder 88 by bolt pin 90, to allow the platform 28 to be lowered.

There is thus provided a utility trailer having flat, ground level loading and in which the platform is shiftable from a ride level to the ground level while keeping the trailer parallel to the group. The platform carriage is free of exposed moving parts, the bearing are shielded, and tilting or canting of the platform is resisted even when eccentrically loaded. The trailer has an improved locking means which automatically lock when the platform is raised into place. The foregoing objects are thus met.

I claim:

1. A utility trailer providing level load support to and from the ground, said trailer comprising a frame supported on wheels, said frame having a transverse base with a top surface and extending therefrom opposed longitudinal frame arms each having a length and a top surface, said frame arms having opposed first and second shaft journaling means, a laterally and longitudinally extended platform between said frame arms, said frame having a top plane defined by the top surfaces of said frame arms and said frame base, said wheels being located midway along the length of said frame arms and longitudinally offset from said first and second journaling means, said platform having a third shaft journaling means extending transversely thereof and offset from said first and second journaling means, drawing means to control shifting of said platform relative to said frame, and platform support means entirely below the top plane of said frame and including a unitary transverse support shaft having first and second end portions journaled in said first and second journaling means and an offset central portion journaled in said third journaling means for guiding vertical movement of said platform, said shaft end portions being free of connection to each other above said frame top plane, whereby said shaft end portions and said shaft central portion are relatively twistable and tilting of said platform from a level condition during shifting of said platform to and from the ground effects twisting of one or another shaft end portion relative to said shaft central portion and such relative twisting torsionally resists said tilting to keep said platform level during said vertical movement.

2. Utility trailer according to claim 1, in which said frame arms each carry a stub axle, said wheels being mounted to said axles.

3. Utility trailer according to claim 1, in which said frame arm first and second journaling means comprise bearings adapted to receive said support shaft end portions in journaling 4. Utility trailer according to claim 1, in which said platform third journaling means comprises a tubular element extending transversely of and below said platform, and bearings within said tubular element adapted to receive said support shaft central portion in journaling relation.

5. Utility trailer according to claim 1, in which said drawing means comprises a cable and reel therefor, said cable coupled to said platform at one end and to said reel at the other end, whereby said cable is reelable in or out to respectively raise or lower said platform.

6. Utility trailer according to claim 1, in which said support shaft further includes offset links connecting respective shaft end portions with said shaft central portion, said links being of a length sufficient to lower said platform from trailer height to the ground, and of a width to fit between said platform and said frame arms.

7. Utility trailer according to claim 1, including also front and rear support shafts spaced along the longitudinal extent of said platform.

8. A utility trailer providing level load support to and from the ground, said trailer comprising a U-shape metal frame having a transverse base and opposed longitudinal frame arms each having a length, said frame base and frame arms each having upper surfaces cooperatively defining a frame top plane, said frame arms carrying stub axle to which trailer wheels are mounted, and fore and aft of said stub axles front and rear pairs of opposed frame arm-carried shaft journaling means, whereby said wheels are located mid-way along the length of said frame arms and longitudinally between said front and rear pairs of frame arm shaft-journaling means, a shiftable, load-carrying, rigid and generally rectangular platform between said frame arms, said platform being adapted to pass between said stub axles from a riding height to the ground, said platform having front and rear shaft journaling means extending parallel to each other and transversely of said platform and offset from respective pairs of said frame arm-carried journaling means, means to control shifting of said platform relative to said frame, and platform support means lying entirely below said frame top plane including independently movable front and rear transversely disposed unitary support shafts each having opposite free end portions journaled in said frame arm shaft journaling means and a central portion journaled in said platform journaling means for guiding vertical movement of said platform, said shaft end portions being interconnected by their respective shaft central portions and only within a locus below said frame top plane, whereby said shaft end portions are free to twist relative to said shaft central portion and to torsionally resist tilting of said platform from a level condition during shifting of said platform to and from the ground.

9. Utility trailer according to claim 8, including also means to lock said platform in upraised position, said locking means comprising mounted on said frame a spring-loaded bolt and detent means for controlling locking movement of said bolt, and keeper means mounted on said platform, said platform defining means to shift said bolt from said detent means responsive to positioning said keeper in bolt-receiving position to lock said platform to said frame.

10. Utility trailer according to claim 8, in which said frame arm journaling means comprise bearing adapted to receive the ends of said support shafts in journaling relation.

11. Utility trailer according to claim 10, in which said platform journaling means comprises front and rear tubular elements secured below said platform adapted to receive the respective centers of said support shafts in journaling relation.

12. Utility trailer according to claim 11, in which said shifting means is a drawing means and comprises a cable and reel therefor, said cable being coupled to said platform at one end and to said reel at the other end, whereby said cable is reelable in or out to respectively raise or lower said platform.

13. Utility trailer according to claim 11, in which said support shafts further includes offset links between the respective center and end portions of said shafts, said links being of a length sufficient to lower said platform from trailer height to the ground.

14. Utility trailer according to claim 13, in which said locking means comprises a spring-loaded bolt and housing combination, a cooperating keeper disposed on frame and platform in opposed relation, and means carried on said keeper to actuate said bolt to enter said keeper responsive to relative movement of said frame and platform to register said bolt with said keeper.

15. Utility trailer according to claim 14, in which said locking means bolt and housing combination further includes a detent formed in said housing adapted to release said bolt responsive to fill lifting of said platform into said frame or to hold said bolt open against its spring loading in the absence of full lifting of said platform into said frame, said actuating means acting on said bolt to free said bolt from said detent in the fully lifted condition of said platform.

16. A utility trailer providing level load support to and from the ground, said trailer comprising a U-shape metal frame having a transverse base and opposed longitudinal frame arms, front and rear shafts extending transversely of said metal frame, said front and rear shafts having end portions and central portions therebetween, said frame arms carrying stub axles to which trailer wheels are mounted, and fore and aft of said stub axles front and rear pairs of opposed frame arm-carried shaft journaling means comprising bearings adapted to receive shaft ends in journaling relation, a shiftable, load-carrying, rigid and generally rectangular platform between said frame arms, said platform being adapted to pass between said stub axles from a riding height to the ground, said platform having front and rear shaft journaling means comprising tubular elements secured below said platform and adapted to receive the center portions of said front and rear shafts respectively, said platform shaft journaling means extending parallel to each other transversely of said platform and offset from respective pairs of said frame arm-carried journaled means, offset links between the respective center and end portions of said shafts, said links being of a length sufficient to lower said platform from trailer height to the ground, drawing means comprising a cable and reel therefor coupled to said platform at one end and to said reel at the other end, whereby said cable is reelable in or out to respectively raise or lower said platform to control shifting of said platform relative to said frame, means to lock said platform in an upraised position, said locking means comprising a spring-loaded bolt and housing combination, a cooperating keeper disposed on frame and platform is opposed relation and a detent formed in said housing adapted to release said bolt responsive to full lifting of said platform into said frame or to hold said bolt open against its spring loading in the absence of full lifting of said platform into said frame, said locking means detent comprising a cam shoulder, said bolt having a cam follower comprising means extending radially from said bolt within said housing and adapted to retain said bolt engaged with said cam shoulder in a first rotational position of said bolt and to disengage from said cam shoulder in a second rotational position of said bolt, and cooperating means of said platform and said bolt to rotate said bolt to said second rotational position in response to full lifting of said platform into said frame, whereby said bolt is disengaged from said cam shoulder and enters said keeper; said front and rear transversely disposed shaft end portions being journaled in said frame arm shaft journaling means, said shaft center portions being journaled in said platform journaling means for guiding vertical movement of said platform, said shafts being disposed to torsionally resist tilting of said platform from a level condition during shifting of said platform to and from the ground.

17. Utility trailer according to claim 16, in which said cooperating means on said bolt extends radially from said bolt beyond said housing, and said cooperating means on said platform comprises tab means in projecting relation on said platform, said tab means upon said platform being raised to fully lifted position deflecting said bolt cooperating means pin to rotate said bolt from said first rotational position with said bolt cam follower means in engagement with said cam shoulder and said bolt withdrawn into said housing to disengage said bolt cam follower means from said cam shoulder to allow said bolt to extend into said keeper upon said platform being raised to fully lifted 18. Utility trailer having a stationary frame member, a relatively movable platform member, and fastener means for locking said members together, said fastener means comprising on one member a bolt housing, a spring-loaded bolt movable translationally into and out of said housing and rotationally on its longitudinal axis, and a bolt keeper on the opposite member to receive said bolt, said bolt housing defining a cam shoulder, said bolt carrying in cam follower comprising a first pin projecting radially from said bolt within said housing, said first pin being adapted to engage said cam shoulder in a first rotational position of said bolt, said bolt carrying a second radially projecting pin outside said housing, longitudinally spaced from said first pin, and means on said opposite member to drive said second pin angularly thereby to rotate said bolt in first pin disengaging relation with said cam shoulder to retain or extend respectively said bolt into said keeper.

19. Utility trailer according to claim 18, in which said second pin driving means comprises tab means carried on said opposite member in fixed position to engage said second pin for rotation to disengage said first pin from said cam shoulder to hold or release said bolt responsive to said movable member entering full registration with said stationary member, respectively.

20. Utility trailer latch assembly for latching a first trailer member to a relatively movable second trailer member, said assembly comprising a latch bolt mounted in a housing on said first trailer member to have translational and rotational freedom, a keeper on said second trailer member, spring means biasing said latch bolt toward said keeper, said housing means limiting latch bolt translational movement toward said keeper in a first angular position of said latch bolt, means to rotate said latch bolt to a second angular position in which said latch bolt translational movement is not limited, said rotating means being carried by said latch bolt and said first trailer member in cooperating relation for rotating said latch bolt upon relative movement between said first and second trailer members and latching said latch bolt in said keeper in response to said relative movement of said members.

* * * * *